US009253356B2

(12) United States Patent
Suzuki

(10) Patent No.: US 9,253,356 B2
(45) Date of Patent: Feb. 2, 2016

(54) IMAGE PROCESSING APPARATUS, INFORMATION PROCESSING METHOD, AND PROGRAM

(71) Applicant: CANON KABUSHIKI KAISHA, Tokyo (JP)

(72) Inventor: Ruri Suzuki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/451,291

(22) Filed: Aug. 4, 2014

(65) Prior Publication Data
US 2015/0062606 A1 Mar. 5, 2015

(30) Foreign Application Priority Data

Aug. 29, 2013 (JP) ................................. 2013-178154

(51) Int. Cl.
*H04N 1/00* (2006.01)
*G06F 3/12* (2006.01)

(52) U.S. Cl.
CPC ............ *H04N 1/00928* (2013.01); *G06F 3/123* (2013.01); *G06F 3/1204* (2013.01); *G06F 3/1285* (2013.01); *H04N 1/00408* (2013.01); *H04N 1/00891* (2013.01)

(58) Field of Classification Search
USPC ......... 358/1.13, 1.14, 1.15; 712/220; 713/320
See application file for complete search history.

(56) References Cited

U.S. PATENT DOCUMENTS

| 8,619,271 | B2* | 12/2013 | Tamai ................ H04N 1/00344 347/19 |
| 2010/0245897 | A1* | 9/2010 | Ando et al. .................. 358/1.15 |
| 2012/0044518 | A1* | 2/2012 | Machida ...................... 358/1.14 |
| 2012/0131315 | A1* | 5/2012 | Tanaka et al. ................. 712/220 |
| 2012/0159212 | A1* | 6/2012 | Takatani et al. .............. 713/320 |
| 2012/0268782 | A1* | 10/2012 | Hamaguchi .................. 358/1.15 |
| 2013/0042097 | A1* | 2/2013 | Baik ..................... G06F 9/4401 713/2 |

FOREIGN PATENT DOCUMENTS

JP 2010-186228 A 8/2010

\* cited by examiner

*Primary Examiner* — Allen H Nguyen
(74) *Attorney, Agent, or Firm* — Canon USA, Inc. IP Division

(57) ABSTRACT

An image processing apparatus includes a registration unit configured to receive a necessity of a restart operation for reflecting setting values of setting data, from a processing execution unit for executing by using the setting data, and to register necessity information in each category corresponding to the processing execution unit, a determination unit configured to determine whether import data includes setting data related to a category registered as a category requiring a restart operation in the registration unit, and a determining unit configured to, based on a result of the determination by the determination unit, determine whether a restart operation is necessary after the import data has been imported.

11 Claims, 9 Drawing Sheets

IP ADDRESS SETTING

| IP ADDRESS | 192.168.0.1 | ~401 |
| SUBNET MASK | 255.255.255.0 | ~402 |
| GATEWAY ADDRESS | 172.168.0.2 | ~403 |

CANCEL  OK
404    405

TOP

- ENVIRONMENTAL SETTINGS
- ADJUSTMENT/MAINTENANCE
- FUNCTION SETTINGS
- DESTINATION SETTINGS
- MANAGEMENT SETTINGS

411

REFLECT SETTINGS   CLOSE
412                413

FIG.5A

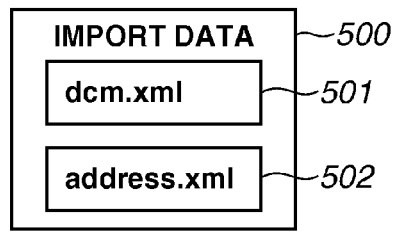

FIG.5B

```
<?xml version="1.0"?>
 <address_settings>
   <xml_file type="xml">address.xml</file>
 </address_settings>
```
503

FIG.5C

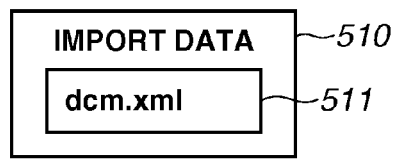

```
<?xml version="1.0" encoding="UTF-8" ?>
<device_settings>
    <network_settings>
        <ipv4> true </ipv4>
        <ip_address> 192.168.0.1 </ip_address>
        <gw> 192.168.0.2 </gw>
        <dns> 192.168.0.4 </dns>
        <dhcp> false </dhcp>
        <ipv6> false </ipv6>
    </network_settings>
    <email_settings>
        <smtp_address> 192.168.1.1</smtp_address>
        <user> aaa </user>
        <password> xxx </password>
    </email_settings>
</device_settings>
```

FIG.6

| CATEGORY (KEY) | NECESSITY OF RESTART OPERATION | |
|---|---|---|
| main_menu_settings | NECESSARY | ~601 |
| addresss_settings | NOT NECESSARY | ~602 |
| ⋮ | ⋮ | |

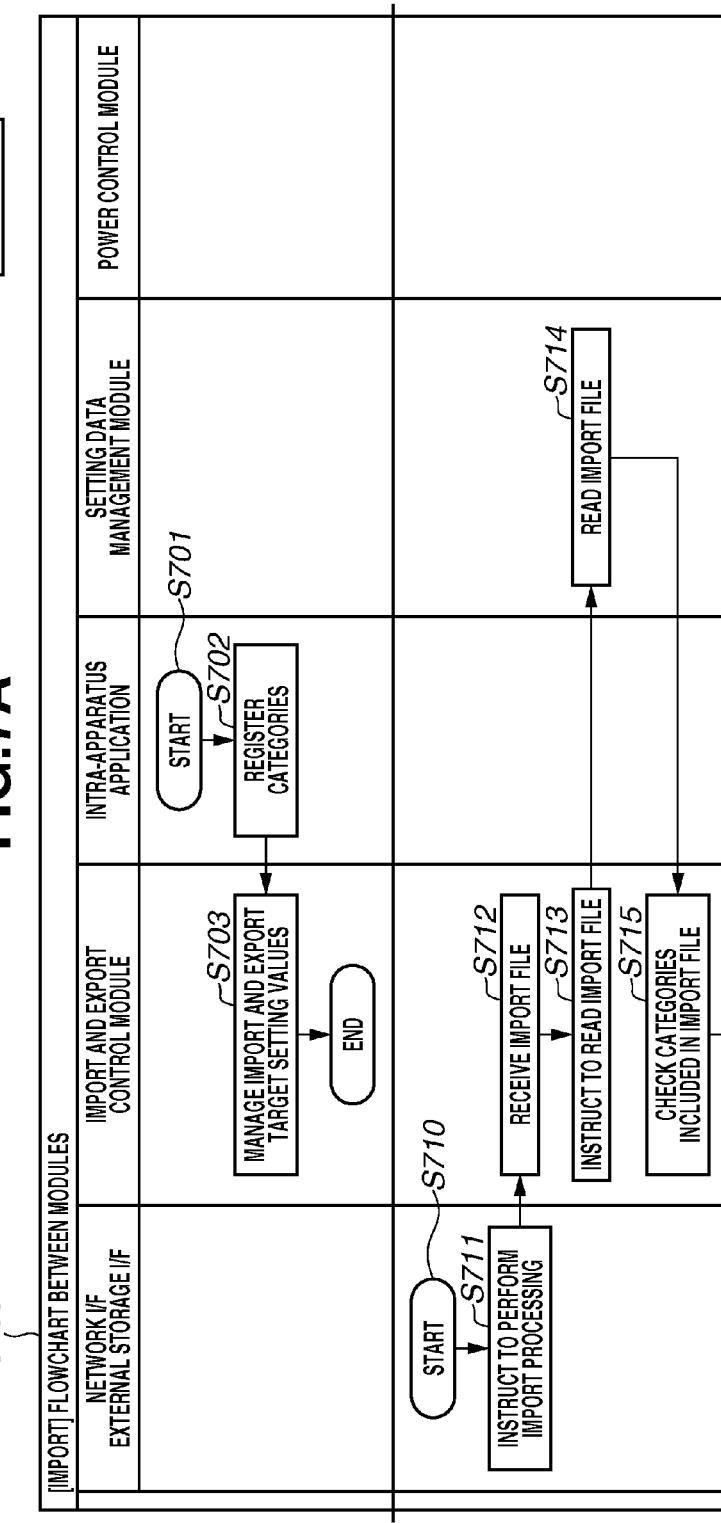

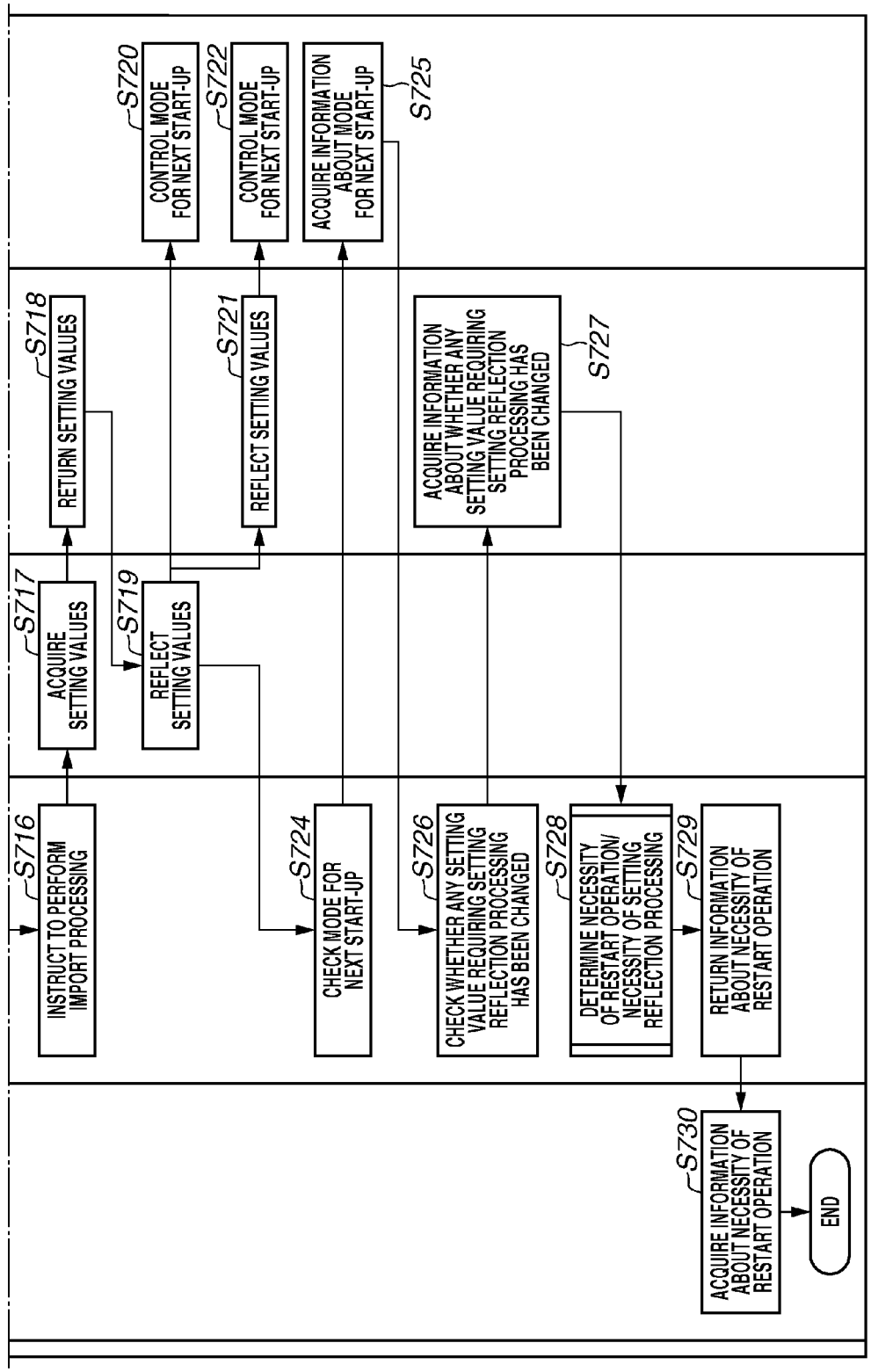

IMAGE PROCESSING APPARATUS, INFORMATION PROCESSING METHOD, AND PROGRAM

BACKGROUND OF THE INVENTION

1. Field of the Invention

The present invention relates to an image processing apparatus, an information processing method, and a program.

2. Description of the Related Art

In image processing apparatuses in recent years, improved multifunctionalization has increased the number of setting items. Manually setting image processing apparatuses one by one imposes a burden on an operator. Accordingly, there has been provided an image processing apparatus having a function of importing and exporting setting values (hereinafter this function is referred to as an import and export function). Thus, the work load on the operator can be reduced.

Setting values which can be set to an image processing apparatus include values which can be immediately reflected upon rewriting on an operation unit, and values which cannot be immediately reflected upon rewriting on the operation unit and can be reflected only after a restart operation. "Immediately reflected" means that, after the operator has changed any setting value, each function is immediately enabled according to the changed setting value.

If the operator imports setting values by using a setting value import function and the imported setting values are not reflected, a user may have a complaint. For this reason, the setting value import function is provided on the premise that a restart operation is necessary after the operator imports the values by using the setting value import function. However, since a restart operation is necessary even when the operator imports only a setting value which can be immediately reflected, the operator's working hours are increased.

Japanese Patent Application Laid-Open No. 2010-186228 discusses a technique for managing the setting values which require a restart operation, based on a table when using the setting value import function. In the technique, when a setting value is imported, the imported setting value is compared with a statically provided table. With this technique, the operator needs to perform a restart operation only when a setting value which requires a restart operation is imported.

In the technique discussed in Japanese Patent Application Laid-Open No. 2010-186228, it is necessary that the import and export function prestores setting values which require a restart operation, as a table. However, the method for storing setting values of the image processing apparatus may not be limited to a specific one.

More specifically, in addition to setting values managed by a module for managing all setting values, there may exist setting values managed in an application-specific format by an application which uses setting values. In this case, since there exist setting values which cannot be grasped, the import and export function cannot prestore setting values which require a restart operation, as the table. Therefore, there is a problem in that the necessity of a restart operation may not be determined in some cases, even if the import and export function statically manages the table.

Further, if the import and export function statically manages the table for determining the necessity of a restart operation, a certain problem arises. Specifically, the increase in the number of setting values of the image processing apparatus makes it necessary to correct the table managed by the import and export function, thus increasing the maintenance load.

SUMMARY OF THE INVENTION

The present invention is directed to providing a technique for reducing the work load on an operator when changing setting values through import processing.

According to an aspect of the present invention, an image processing apparatus includes a registration unit configured to receive a necessity of a restart operation for reflecting setting values of setting data from a processing execution unit for executing processing by the using setting data, and to register necessity information to each category corresponding to the processing execution unit, a determination unit configured to determine whether import data includes setting data related to a category registered as a category requiring a restart operation in the registration unit, and a determining unit configured to, based on a result of the determination by the determination unit, determine whether a restart operation is necessary after the import data has been imported.

Further features of the present invention will become apparent from the following description of exemplary embodiments with reference to the attached drawings.

BRIEF DESCRIPTION OF THE DRAWINGS

FIGS. 4A and 4B illustrate example display screens for setting of setting values.

FIGS. 5A, 5B, 5C, and 5D illustrate example import data.

FIG. 6 illustrates an example of necessity of a restart operation for each category.

FIGS. 7A and 7B are a flowchart (1) illustrating example processing performed by an image processing apparatus.

DESCRIPTION OF THE EMBODIMENTS

Figure 1:
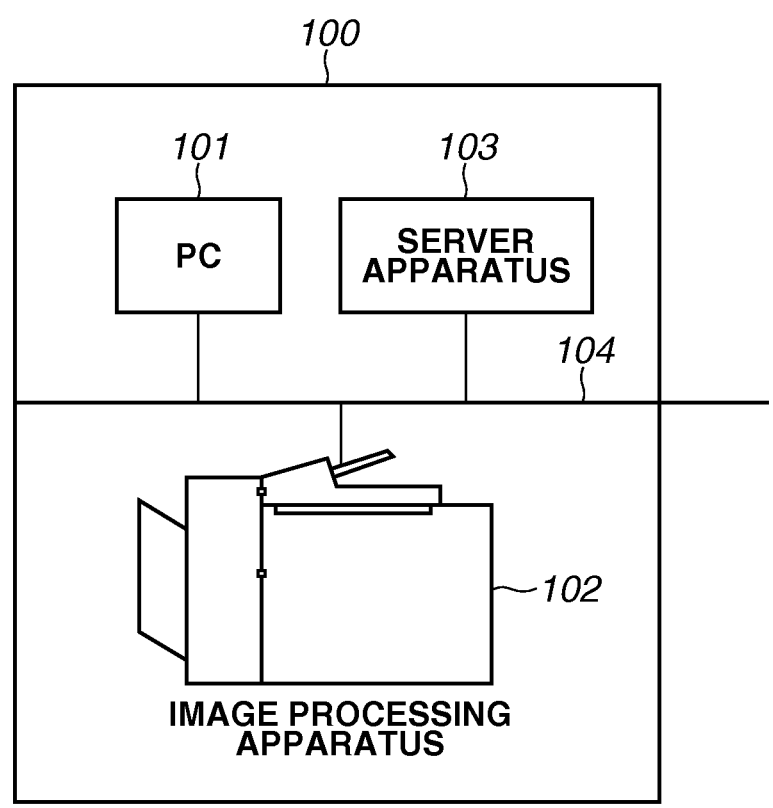
FIG. 1 illustrates an example system configuration.

Various exemplary embodiments, features, and aspects of the invention will be described in detail below with reference to the drawings.

Exemplary embodiments of the present invention will be described below with reference to the accompanying drawings.

<Definition of Terms>

First of all, terms used in the exemplary embodiments (described below) will be defined.

"Export" means an operation of an image processing apparatus to output information about setting values (hereinafter simply referred to as setting values) to the outside. For example, simply by importing setting values exported by any image processing apparatus to another image processing apparatus, a user can easily set setting values to another image processing apparatus.

"Export data" means setting values exported by an image processing apparatus. More specifically, export data includes setting values related to an address book and administrator settings, and setting values related to network settings.

"Import" means an operation of an image processing apparatus to acquire setting values from outside and reflect them.

"Import data" means setting values received by an image processing apparatus for the purpose of import. The above-described export data exported by any image processing apparatus is identical to the above-described import data imported by another image processing apparatus by using the relevant export data.

A "category" means a unit of classification selectable by the user when an image processing apparatus exports setting values. For example, "Address Book" and "Main Menu Setting" are example categories. Categories will be described in detail below with reference to FIGS. 5 and 6. "Quick start-up" means a start-up mode in which the image processing apparatus starts quicker than in the normal start-up mode. Usually, when the user turns OFF a seesaw switch, the power of the image processing apparatus turns OFF. Then, when the user turns the seesaw switch back ON, the image processing apparatus starts in the normal start-up mode. There is a mode for starting the image processing apparatus quicker than in the normal start-up mode (quick OFF mode to be described below). The image processing apparatus enters the quick OFF mode when the user turns OFF the seesaw switch. When the user turns OFF the power in the quick OFF mode, the image processing apparatus can be next time activated quicker than in the normal start-up mode.

"Quick OFF" means a state equivalent to the power OFF state, however, means a mode in which the image processing apparatus is maintained to be able to start next time in the above-described quick start-up mode. Although, in the quick OFF mode, the image processing apparatus does not receive a job, it keeps supplying the power to memory to enable starting next time in the quick start-up mode.

An application of the image processing apparatus can control the image processing apparatus not to enter the quick OFF mode via a module for managing power control for the image processing apparatus. In a state where the image processing apparatus cannot enter the "quick OFF" mode, when the user turns OFF the seesaw switch, the image processing apparatus will start next time in the normal start-up mode. When a restart operation is necessary to reflect setting values, setting values are not reflected on the image processing apparatus even after the user turns OFF the seesaw switch in the quick OFF mode and then turns it back ON.

This completes descriptions of terms. Terms other than the above-described ones will be suitably described below.

A first exemplary embodiment will be described below with reference to FIGS. 1 to 8.

<Description of System Configuration>

The first exemplary embodiment will be described below. FIG. 1 illustrates an example configuration of a system 100 which includes an image processing apparatus 102 operating as an information processing apparatus.

The system 100 according to the present exemplary embodiment includes the image processing apparatus 102, a personal computer (PC) 101, a plurality of network apparatuses such as a server apparatus 103, and a local area network (LAN) 104 to which the network apparatuses are connected. The image processing apparatus 102 operates even in an environment in which it is connected to a network via the LAN 104, or in an environment in which it is not connected to a network and a universal serial bus (USB) memory is used to import and export data.

The image processing apparatus 102 can import and reflect setting values according to an import instruction from the PC 101 or the server apparatus 103, or import and reflect setting values according to an import instruction from the user via the operation unit of the image processing apparatus 102. The image processing apparatus 102 can export setting values set thereto to the PC 101 and the server apparatus 103, and export setting values to a USB memory.

<Description of Hardware Configuration>

The hardware configuration of the image processing apparatus 102, the PC 101, and the server apparatus 103 in the present system will be described below with reference to FIGS. 2A and 2B.

Figure 2A:
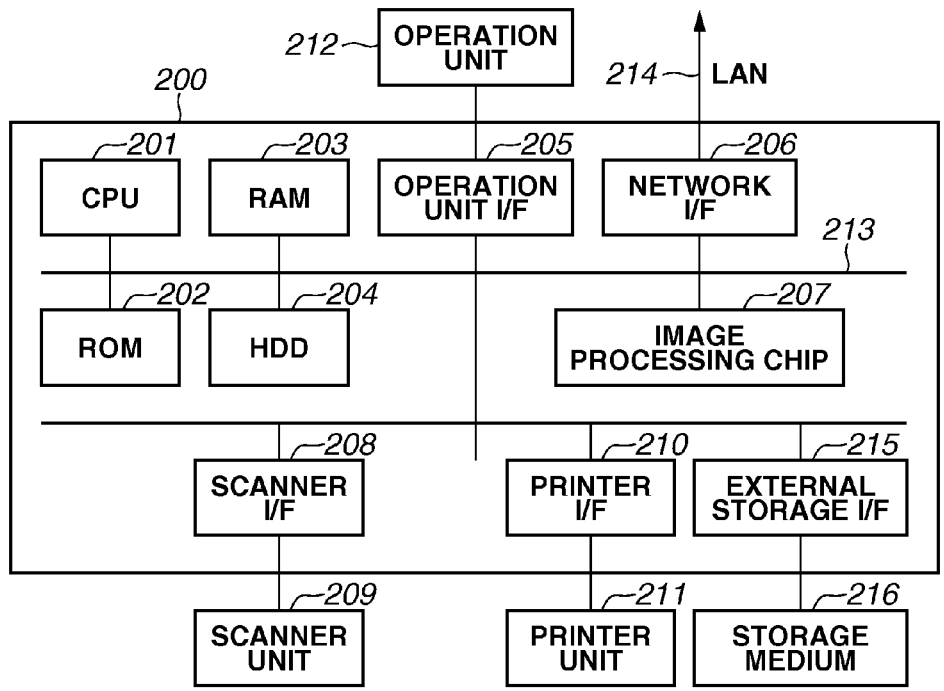
FIGS. 2A and 2B illustrate example hardware configurations.

FIG. 2A illustrates an example hardware configuration of the image processing apparatus 102.

A control unit 200 including a central processing unit (CPU) 201 totally controls the image processing apparatus 102.

The CPU 201 reads and executes a control program stored in a read only memory (ROM) 202 to implement the software configuration of the image processing apparatus 102 and the processing related to flowcharts (described below).

The ROM 202 stores programs of the image processing apparatus 102.

A random access memory (RAM) 203 serves not only as a system work memory for CPU 201 operation but also as a memory for temporarily storing image data. The RAM 203 includes a static RAM (SRAM) in which the stored contents are retained even after the power is turned OFF, and a dynamic RAM (DRAM) in which the stored contents are erased when the power is turned OFF.

A hard disk drive (HDD) 204 stores image data, various programs, and tables for various data.

An operation unit interface (I/F) 205 connects a system bus 213 and an operation unit 212. The operation unit I/F 205 outputs to the system bus 213 image data to be displayed on the operation unit 212 and information input from the operation unit 212.

The operation unit 212 is provided with a liquid crystal display (LCD) unit having a touch panel function, and a keyboard.

A network I/F 206 connects a local area network (LAN) 214 and the system bus 213 to input and output information.

A scanner I/F 208 edits (corrects and processes) image data received from the scanner unit 209. The scanner I/F 208 determines whether the received image data is a color document, a monochrome document, a text document, or a photographic document. Then, the scanner I/F 208 adds the result of the determination to the image data. Information added to the image data by the scanner I/F 208 is referred to as attribute data.

A printer I/F 210 receives image data transmitted from an image processing chip 207, and, by referring to the attribute data added to the image data, performs image formation on the image data.

The control unit 200 transmits the image data having undergone image formation to a printer unit 211 via the printer I/F 210.

The printer unit 211 prints the image data transmitted from the control unit 200 on a recording medium.

An external storage I/F 215 connects with a storage medium 216, and stores in the storage medium 216 data and images in the image processing apparatus 102. The external storage I/F 215 reads data in the storage medium 216, and stores it in the HDD 204 in the image processing apparatus 102.

Figure 2B:
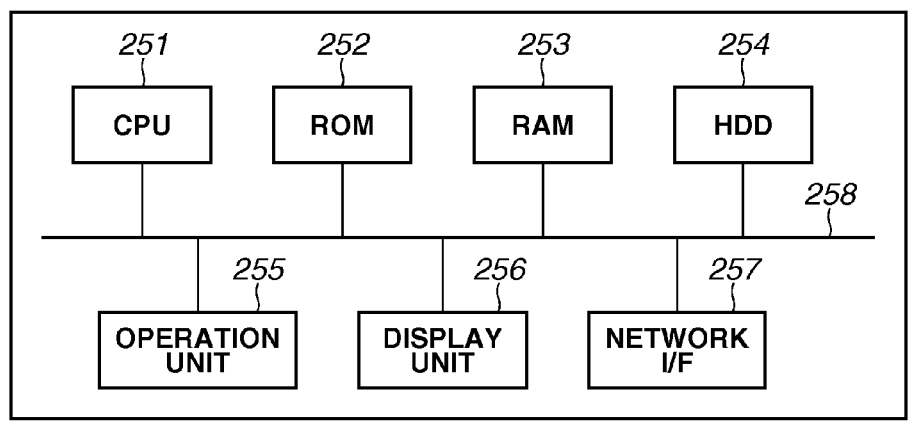

FIG. 2B illustrates an example hardware configuration of the PC 101 and the server apparatus 103.

The hardware configuration of the PC 101 will be described below.

A CPU 251 of the PC 101 controls the entire PC 101. The CPU 251 of the PC 101 executes a program stored in a ROM 252 of the PC 101 to implement the processing of the PC 101.

The ROM 252 of the PC 101 stores a program to be executed by the CPU 251 of the PC 101.

A RAM 253 of the PC 101 serves not only as a system work memory for operation of the CPU 251 of the PC 101 but also as a memory for temporarily storing various data.

A HDD 254 of the PC 101 stores various programs and various data required by the PC 101 to perform processing.

An operation unit 255 of the PC 101 is a keyboard or a mouse which receive user operations. The operation unit 255 of the PC 101 may be integrated with a display unit having a touch panel function.

A display unit 256 of the PC 101 is a display for displaying information of the PC 101. The display unit 256 of the PC 101 may be a touch panel integrated with the operation unit 255 of the PC 101.

A network I/F 257 of the PC 101 connects the PC 101 and an external apparatus. The above-described apparatuses are mutually connected via a system bus 258.

The hardware configuration of the server apparatus 103 is similar to that of the PC 101, and redundant description thereof will be omitted. Specifically, the CPU 251 of the server apparatus 103 executes a program stored in the ROM 252 of the server apparatus 103 to implement the processing of the server apparatus 103.

<Description of Software Configuration of Image Processing Apparatus 102>

The software configuration of the image processing apparatus 102 will be described below with reference to FIG. 3.

Figure 3:
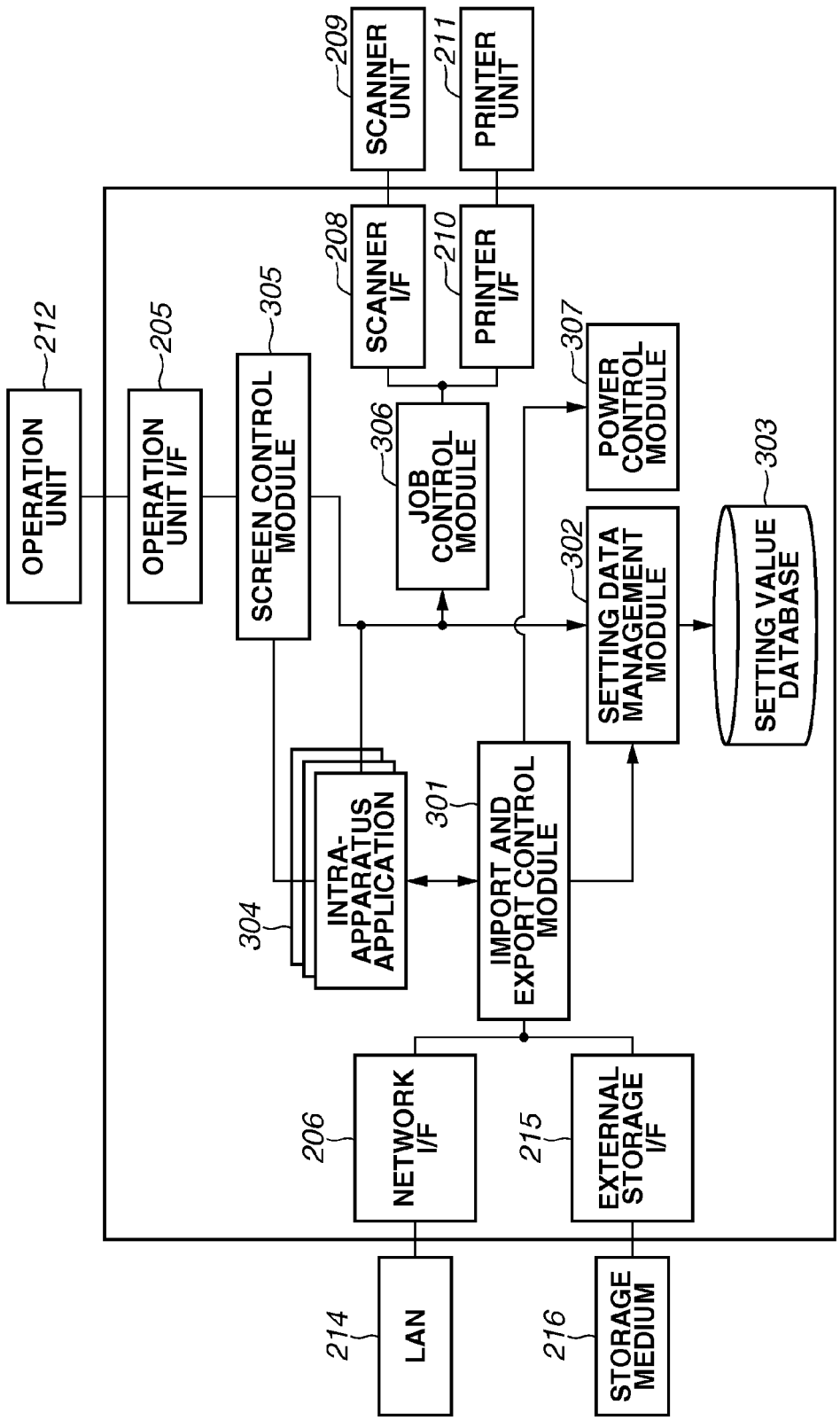
FIG. 3 illustrates an example software configuration.

FIG. 3 illustrates an example software configuration of the image processing apparatus 102.

FIG. 3 extracts and illustrates only software modules necessary to execute processing according to the present exemplary embodiment, out of software modules necessary to operate the image processing apparatus 102.

An import and export control module 301 captures import data and generates export data. When performing export processing, the import and export control module 301 acquires intra-apparatus setting data stored in a setting value database 303 via a setting data management module 302, and converts the data into an exportable format. Then, the import and export control module 301 transmits data to an external terminal via the network I/F 206, and stores data in the storage medium 216 via the external storage I/F 215. The database 303 and a plurality of storage apparatuses (such as HDDs) for storing data are collectively referred to as a database.

When performing import processing, the import and export control module 301 acquires import data via the network I/F 206 or the external storage I/F 215. Then, the import and export control module 301 interprets the acquired import data, and stores the data in the setting value database 303 via the setting data management module 302.

The setting data management module 302 is an access module for the setting value database 303, and stores various parameters for apparatus control.

Each of intra-apparatus applications 304 performs copying, scanning, printing, image conversion, and data transmission and reception. An intra-apparatus application 304 acquires various setting information necessary to perform processing, from the setting value database 303 via the setting data management module 302. Some of intra-apparatus applications 304 manage various setting information necessary to perform processing based on their own categories. Further, the intra-apparatus application 304 displays information on the operation unit 212 via a screen control module 305, or displays on the operation unit 212 a screen for receiving an instruction from the user. When it is necessary to set or change a parameter, the intra-apparatus application 304 displays on the operation unit 212 a screen having a display form for prompting the user to input data, which is one of screen display forms stored in the screen control module 305. Then, in response to a setting change request received from the user via the operation unit 212, the intra-apparatus application 304 changes the contents of the setting value database 303 via the setting data management module 302. Further, when performing job processing by using the scanner unit 209 and the printer unit 211, the intra-apparatus application 304 instructs a job control module 306 to perform job processing. Each intra-apparatus application 304 is an example of a processing execution unit.

The job control module 306 operates the scanner unit 209 and the printer unit 211 via the scanner I/F 208 and the printer I/F 210 to perform scanning and printing, respectively. The job control module 306 acquires various setting information, such as parameters necessary to perform these processings, from the setting value database 303 via the setting data management module 302.

A power control module 307 manages processing for controlling the power of the image processing apparatus 102. More specifically, the power control module 307 controls shutdown processing and, manages the start-up mode in which the image processing apparatus 102 will start next time.

<Description of Setting Values which Requires Setting Reflection Processing>

FIGS. 4A and 4B illustrate example display screens for setting setting values.

FIG. 4A illustrates an example display screen for setting an IP address.

A case where setting reflection processing is necessary after changing a setting value will be described below with reference to FIG. 4A.

As example cases where setting reflection processing is necessary, cases where setting values of "IP ADDRESS", "SUBNET MASK", and "GATEWAY ADDRESS" are changed will be described below. In this case, the image processing apparatus 102 is assumed to display a display screen 400 on the operation unit 212. It is assumed that an intra-apparatus application 304 has received inputs of an IP address (192.168.0.1) 401, a subnet mask (255.255.255.0) 402, and a gateway address (192.168.0.2) 403 via a user operation on the operation unit 212, and then received a selection of an OK button 405 via a user operation on the operation unit 212. In this case, via the setting data management module 302, the intra-apparatus application 304 changes the relevant setting values stored in the setting value database 303 to the setting values input via the operation unit 212.

However, an intra-apparatus application 304 which refers to the IP address, operates by referring to the IP address stored in the intra-apparatus application 304. Therefore, the image processing apparatus 102 does not operate according to the setting values stored in the setting value database 303.

FIG. 4B illustrates an example display screen including a setting reflection button.

When the setting data management module 302 detects that any setting value which requires setting reflection processing has been changed, the image processing apparatus 102 displays on the operation unit 212 a display screen 410 including a "REFLECT SETTINGS" button 412, as illustrated in FIG. 4B. Upon reception of the selection of the "REFLECT SETTINGS" button 412 via a user operation on the operation unit 212, the setting data management module 302 instructs the intra-apparatus application 304 which refers to network settings, such as the IP address, to reflect the relevant setting value.

When the intra-apparatus application 304 is instructed to reflect the setting values, it operates referring to the setting values stored in the setting value database 303.

<Detailed Descriptions of Import Data>

Import data will be described in detail below with reference to FIGS. 5A to 5D.

FIGS. 5A to 5D illustrate example import data.

Import data of setting value categories managed in an application-specific format by an intra-apparatus application 304 will be described in detail below with reference to FIGS. 5A and 5B. For example, a case of "Address Book" which is a setting value category managed in an application-specific format by the intra-apparatus application 304 will be described below.

Import data 500 includes a file 501 which includes setting values managed by the setting data management module 302, and a file 502 which includes setting values managed in an application-specific format by the intra-apparatus application 304. The import data 500 includes as different files import data of setting value categories managed in an application-specific format by the intra-apparatus application 304. The file 501 including the setting values managed by the setting data management module 302 has a description that the import data 500 includes the Address Book category. The file 501 further has a description that the import data 500 includes a setting value file 503 in an application-specific format related to an address book "address.xml" illustrated in FIG. 5B.

Import data of setting value categories in the intra-apparatus application 304 using the setting values managed by the setting data management module 302 will be described below with reference to FIGS. 5C and 5D.

Import data 510 includes a file 511 which includes the setting values managed by the setting data management module 302. The file 511 further includes setting values of import and export target categories in a format interpretable by the setting data management module 302, as illustrated in FIG. 5D.

Setting schemas are different between the setting values managed in an application-specific format by the intra-apparatus application 304 illustrated in FIGS. 5A and 5B, and the setting values managed by the setting data management module 302 illustrated in FIGS. 5C and 5D. Therefore, the import and export control module 301 cannot uniquely manage setting values.

<Description of Management of Import Target Categories>

FIG. 6 illustrates an example of the necessity of a restart operation for each of import and export target categories managed by the import and export control module 301.

When the intra-apparatus application 304 activates the image processing apparatus 102 or itself, the intra-apparatus application 304 registers a "key" representing an import and export target setting value category to the import and export control module 301. Further, when an intra-apparatus application 304 manages setting values which require a restart operation to reflect them when imported, the intra-apparatus application 304 registers the necessity of a restart operation in the import and export control module 301.

For example, the setting values related to "Main Menu" require a restart operation to reflect them when imported. Therefore, the intra-apparatus application 304 managing "Main Menu" registers a key "main_menu_settings" that represents the main menu in the import and export control module 301, and further notifies the import and export control module 301 of the necessity of a restart operation.

Setting values related to "Address Book" are reflected without requiring a restart operation when imported. Therefore, the intra-apparatus application 304 which manages "Address Book" registers a key "address_settings" that represents the address book in the import and export control module 301.

The import and export control module 301 manages import and export target categories by associating keys registered as an import and export target with the necessity of a restart operation. When the key "main_menu_settings" is imported, the import and export control module 301 manages it as a setting value which requires a restart operation. When the key "address_settings" is imported, the import and export control module 301 manages it as a setting value not requiring a restart operation.

Processing performed by the image processing apparatus 102 will be described below with reference to FIG. 7.

FIG. 7 is a flowchart illustrating example processing performed by the image processing apparatus 102. Processing for registering import and export target setting values and import-related processing will be described in detail below.

<Processing for Registering Import and Export Target Setting Values>

Processing for registering import and export target setting values will be described below.

In step S701, the image processing apparatus 102 starts processing.

In step S702, when the intra-apparatus application 304 activates the image processing apparatus 102 or itself, the intra-apparatus application 304 registers setting value categories managed by it in the import and export control module 301 by using keys. Setting values registered by using keys in step S702 are import and export target setting values. The present exemplary embodiment is directed to the import processing as described above. In the registration in step S702, when the intra-apparatus application 304 manages the setting values which are reflected only after a restart operation, the intra-apparatus application 304 registers the necessity of a restart operation together.

In step S703, based on the information registered by the intra-apparatus application 304, the import and export control module 301 manages the setting values directed to the import and export.

The above-described processing enables the image processing apparatus 102 to manage the necessity of a restart operation for reflecting the setting values directed to the import and export, in consideration of the setting values managed in an application-specific format by the intra-apparatus application 304.

<Import-related Processing>

Import-related processing will be described below.

In step S710, the image processing apparatus 102 starts the processing.

In step S711, according to an import instruction received from the user via the operation unit 212, the network I/F 206 and the external storage I/F 215 instruct the import and export control module 301 to perform the import processing.

In step S712, the import and export control module 301 receives an import file via the network I/F 206 or the external storage I/F 215. Upon reception of the import instruction, the import and export control module 301 instructs the job control module 306 to stop backup and restore processing other than the present processing and COPY job and FAX job processing.

In step S713, the import and export control module 301 instructs the setting data management module 302 to develop and read the import file received in step S712 so as to analyze it.

In step S714, the setting data management module 302 develops and reads the import file on which the instruction has been received in step S713.

In step S715, the import and export control module 301 checks the categories included in the import file.

In step S716, the import and export control module 301 instructs the intra-apparatus application 304 to import the categories included in the import file checked in step S715.

In step S717, upon reception of the import instruction, the intra-apparatus application 304 acquires the setting values read by the setting data management module 302 in step S714. When setting values are managed in an application-specific format, the intra-apparatus application 304 acquires the file 502 having the application-specific format. Then, the intra-apparatus application 304 analyzes and reflects the acquired file 502. When any setting value which requires a restart operation to reflect it has been imported, the intra-apparatus application 304 notifies the power control module 307 of the impossibility of entering the quick OFF mode.

In step S720, upon reception of the notification, the power control module 307 performs control so that the quick OFF mode cannot be entered. Specifically, when the seesaw switch is turned OFF, the power control module 307 performs control so that the image processing apparatus 102 will be activated next time in the normal start-up mode, not in the quick start-up mode.

When the setting values used by the intra-apparatus application 304 are the setting values managed by the setting data management module 302, in step S719, the intra-apparatus application 304 instructs the setting data management module 302 to reflect the setting values. In this case, the setting data management module 302 has returned the setting values to the intra-apparatus application 304 in step S718.

In step S721, in response to the relevant instruction of the intra-apparatus application 304, the setting data management module 302 reflects the specified setting values on the setting value database 303. It is assumed that the setting values which require a restart operation are included in the setting values reflected on the setting value database 303 in step S721. After the setting data management module 302 has changed any setting value of the setting value database 303, then in step S722, the power control module 307 performs control so that the image processing apparatus 102 cannot enter the quick OFF mode.

After completion of the import processing by the intra-apparatus application 304, then in step S724, the import and export control module 301 instructs the power control module 307 to check whether the quick start-up mode can be entered.

In step S725, the power control module 307 acquires information about the start-up mode in which the image processing apparatus 102 will be started next time, and notifies the import and export control module 301 of the relevant information.

In step S726, in the above-described import processing, the import and export control module 301 instructs the setting data management module 302 to check whether any setting value which requires setting reflection processing has been changed. In step S727, the setting data management module 302 acquires the information about whether any setting value which requires setting reflection processing has been changed. For example, a case where a setting value, such as "IP ADDRESS", has been changed and the "REFLECT SETTINGS" button 412 is displayed, as illustrated in FIGS. 4A and 4B, is a case where setting reflection processing is necessary.

In step S728, the import and export control module 301 determines the necessity of a restart operation in the import processing. Processing in step S728 will be described in detail below with reference to FIG. 8.

In step S729, the import and export control module 301 returns information about the necessity of a restart operation determined in step S728 to the I/F from which the import instruction has been received.

In step S730, the network I/F 206 and the external storage I/F 215 acquire the information about the necessity of a restart operation. The network I/F 206 and the external storage I/F 215 are the above-described network I/F 206 and external storage I/F 215 from which the import instruction has been received. When the information about the necessity of a restart operation acquired in step S730 indicates that a restart operation is necessary, the image processing apparatus 102 displays a message for prompting a restart operation on the operation unit 212 and a UI of the apparatus from which the import instruction has been received. Thus, the user can check the necessity of a restart operation.

The above-described processing enables the image processing apparatus 102 to suitably determine the necessity of a restart operation for reflecting the setting values to be imported and perform the import processing, even in a case where setting values are managed in an application-specific format by the intra-apparatus application 304.

<Processing for Determining Necessity of Restart Operation and Necessity of Setting Reflection Processing>

The above-described processing in step S728 illustrated in FIG. 7 will be described in detail below with reference to FIG. 8.

Figure 8:
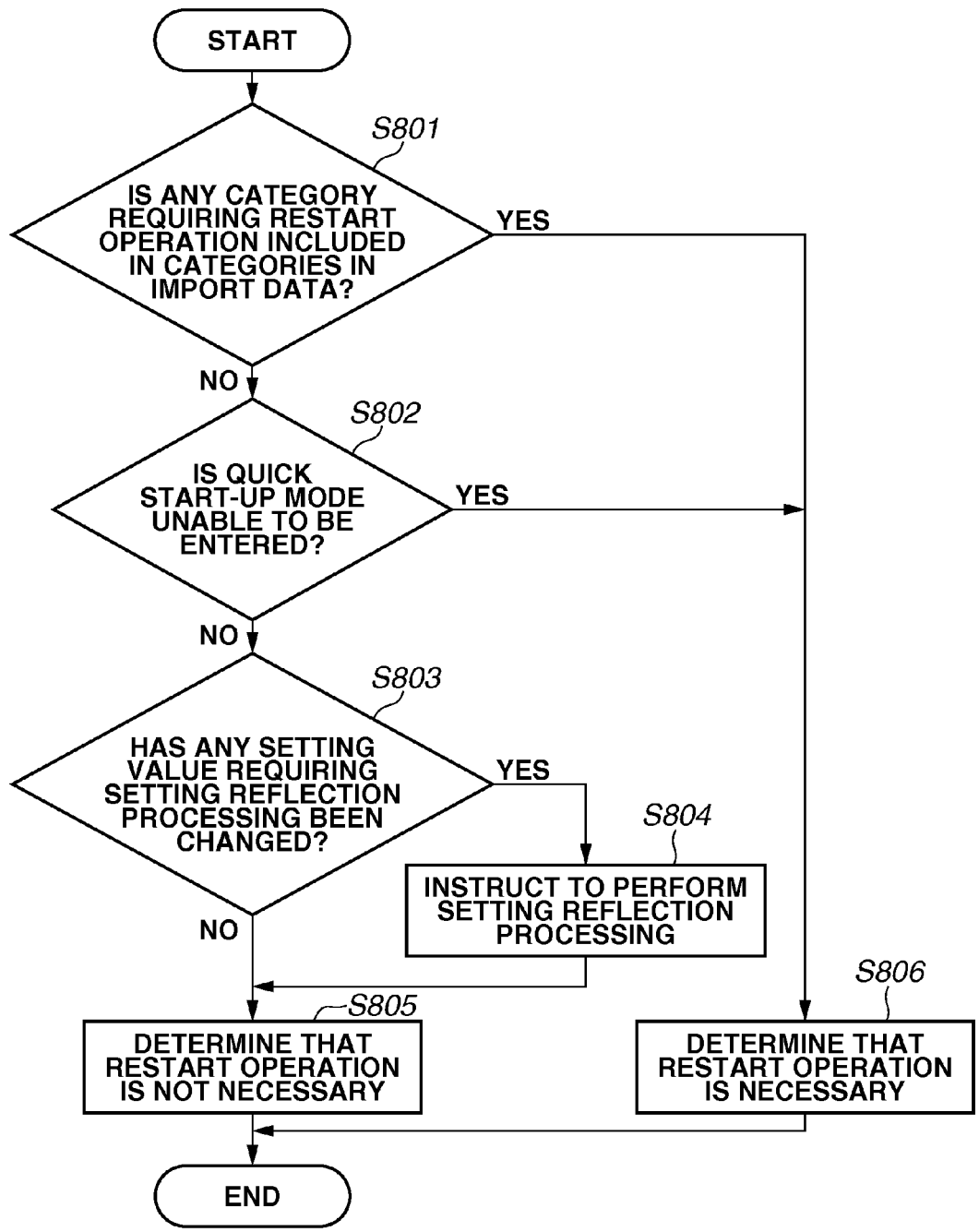
FIG. 8 is a flowchart (2) illustrating example processing performed by the image processing apparatus.

FIG. 8 is a flowchart illustrating example processing for determining the necessity of a restart operation, and example processing for determining the necessity of setting reflection processing.

In step S801, the import and export control module 301 determines whether any category which requires a restart operation is included in the categories in the import data read in step S714. More specifically, the import and export control module 301 compares each key included in the import data with the key registered by each intra-apparatus application 304 in step S703. Then, the import and export control module 301 determines whether any key included in the import data is registered as a key requiring a restart operation after the import processing. When the import and export control module 301 determines that any category requiring a restart operation is included in the import data (YES in step S801), the processing proceeds to step S806. On the other hand, when the import and export control module 301 determines that any category requiring a restart operation is not included in the import data (NO in step S801), the processing proceeds to step S802.

In step S806, the import and export control module 301 determines that a restart operation is necessary.

In step S802, based on the result of the determination acquired in step S724, the import and export control module 301 determines whether the quick start-up mode cannot be entered. When the import and export control module 301 determines that the quick start-up mode cannot be entered (YES in step S802), the processing proceeds to step S806. On the other hand, when the import and export control module 301 determines that the quick start-up mode can be entered (NO in step S802), the processing proceeds to step S803. The processing in step S802 is example processing for determining the method for starting up the image processing apparatus 102. Thus, the image processing apparatus 102 can also determine the necessity of a restart operation in consideration of the method for starting up the image processing apparatus 102 next time. The processing in step S801 and the processing in step S802 do not need to be performed together. Only one of the processings may be performed.

In step S803, based on the result of the determination acquired in step S726, the import and export control module 301 determines whether any setting value which requires setting reflection processing has been changed by the import processing. When the import and export control module 301 determines that any setting value which requires setting reflection processing has been changed (YES in step S803), the processing proceeds to step S804. On the other hand, when the import and export control module 301 determines that any setting value which requires setting reflection processing has not been changed (NO in step S803), the processing proceeds to step S805.

In step S804, the import and export control module 301 instructs the setting data management module 302 to perform setting reflection processing.

In step S805, the import and export control module 301 determines that the restart operation is not necessary, and the processing exits this flowchart. Specifically, when the import and export control module 301 determines that a restart operation is not necessary, and that any setting value which requires setting reflection processing has not been changed in the processing in steps S801, S802, and S803, the import and export control module 301 determines that a restart operation is not necessary.

The above-described processing enables the image processing apparatus 102 to determine whether a restart operation needs to be performed after setting values have been imported. With the above-described processing, the user does not need to perform an unnecessary restart operation. Thus, it becomes possible to improve the import processing efficiency and reduce the work load.

<Other Exemplary Embodiments>

The present invention can also be achieved by performing the following processing. Specifically, software (programs) for implementing the functions of the above-described exemplary embodiments is supplied to a system or an apparatus via a network or various storage media, and a computer (or a CPU or a microprocessor unit (MPU)) of the system or apparatus reads and executes the programs.

According to each of the above-described exemplary embodiments, when the user imports setting values to the image processing apparatus 102, the image processing apparatus 102 can determine the necessity of a restart operation for reflecting the setting values, in consideration of the setting values managed in an application-specific format by the intra-apparatus application 304. Therefore, the user does not need to perform an unnecessary restart operation. Further, even in a case where the number of setting values has increased through the import processing, the user does not need to change a setting value table managed by the image processing apparatus 102, thus improving maintainability. Therefore, it is possible to provide a technique for reducing the work load on the operator when changing the setting values through the import processing.

While the present invention has specifically been described based on the above-described exemplary embodiments, the present invention is not limited thereto but can be modified in diverse ways within the ambit of the appended claims.

According to the present invention, it is possible to provide a technique for reducing the work load on the operator when changing the setting values through the import processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-178154 filed Aug. 29, 2013, which is hereby incorporated by reference herein in its entirety.

What is claimed is:

1. An image processing apparatus comprising:
    a registration unit configured to register, for each of a plurality of categories of setting data, whether a restart operation of the image processing apparatus is required after setting of setting data;
    an acquisition unit configured to acquire setting data to be set to the image processing apparatus;
    a setting determination unit configured to determine whether the acquired setting data includes setting data related to a category registered as a category requiring a restart operation in the registration unit;
    a setting unit configured to set the acquired setting data; and
    a restart determining unit configured to determine whether the restart operation of the image processing apparatus is required in a case where the setting determination unit determines that the acquired setting data includes the setting data related to the category registered as the category requiring the restart operation, and determine whether the restart operation of the image processing apparatus is not required in case where the setting determination unit determines that the acquired setting data does not include the setting data related to the category registered as the category requiring the restart operation.

2. The image processing apparatus according to claim 1, further comprising:
    a start-up method determination unit configured to determine whether a method for starting up the image processing apparatus next time after the import is performed, is a first start-up method involving a restart operation or a second start-up method not involving a restart operation,
    wherein, based on the result of the determination by the setting determination unit and a result of the determination by the restart determination unit, the restart determining unit determines whether a restart operation is necessary.

3. The image processing apparatus according to claim 1, further comprising:
    a display unit configured to, when the restart determining unit determines that a restart operation is necessary, display a screen for a restart instruction on an operation unit.

4. The image processing apparatus according to claim 1, further comprising:
    an instruction unit configured to, when the restart determining unit determines that a restart operation is not necessary, instruct a setting data management unit to reflect changed setting data.

5. The image processing apparatus according to claim 1, wherein, upon reception of a necessity of a restart operation for reflecting setting values of setting data, from an application functioning as a processing execution unit for executing by using the setting data, the registration unit registers necessity information in each category corresponding to the application.

6. An information processing method performed by an image processing apparatus, the method comprising:
    registering, for each of a plurality of categories of setting data, whether a restart operation of the image processing apparatus is required after setting of setting data;

acquiring setting data to be set to the image processing apparatus;

determining whether the acquired setting data includes setting data related to a category registered as a category requiring a restart operation;

setting the acquired setting data; and determining whether the restart operation of the image processing apparatus is required in a case where it is determined that the acquired setting data includes the setting data related to the category registered as the category requiring the restart operation, and determining whether the restart operation of the image processing apparatus is not required in case where it is determined that the acquired setting data does not include the setting data related to the category registered as the category requiring the restart operation.

7. The image processing method according to claim 6, further comprising:

determining whether a method for starting up the image processing apparatus a next time after the import is performed, is a first start-up method involving a restart operation or a second start-up method not involving a restart operation, wherein, the determining whether a restart operation is necessary, is determined based on the result of (1) the determining whether the acquired setting import data includes setting data related to a category registered as a category requiring a restart operation, and (2) the result of the start-up method determination.

8. The image processing method according to claim 6, further comprising:

displaying, when it is determined that a restart operation is necessary, a screen for a restart instruction on an operation unit.

9. The image processing method according to claim 6, further comprising:

managing the setting data, and issuing an instruction for reflecting changed setting data, when it is determined that a restart operation is unnecessary.

10. The image processing method according to claim 6, wherein, in the registering, upon reception of a necessity of a restart operation for reflecting setting values of setting data, from an application for the execution of processing by using the setting data, necessity information is registered in each category corresponding to the application.

11. A non-transitory storage medium storing a program for causing a computer to execute a method comprising:

registering, for each of a plurality of categories of setting data, whether a restart operation of the image processing apparatus is required after setting of setting data;

acquiring setting data to be set to the image processing apparatus;

determining whether the acquired setting data includes setting data related to a category registered as a category requiring a restart operation;

setting the acquired setting data; and determining whether the restart operation of the image processing apparatus is required in a case where it is determined that the acquired setting data includes the setting data related to the category registered as the category requiring the restart operation, and determining whether the restart operation of the image processing apparatus is not required in case where it is determined that the acquired setting data does not include the setting data related to the category registered as the category requiring the restart operation.

* * * * *